(12) United States Patent
McMorran et al.

(10) Patent No.: US 12,724,590 B2
(45) Date of Patent: Sep. 1, 2026

(54) SOFTWARE DEVELOPMENT LANGUAGE MODEL PROMPT ENGINEERING

(71) Applicant: Microsoft Technology Licensing, LLC, Redmond, WA (US)

(72) Inventors: Benjamin John McMorran, Redmond, WA (US); Ion Todirel, Bellevue, WA (US); Bogdan Ionut Mihalcea, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 187 days.

(21) Appl. No.: 18/380,113

(22) Filed: Oct. 13, 2023

(65) Prior Publication Data

US 2025/0123814 A1 Apr. 17, 2025

(51) Int. Cl.
*G06F 8/33* (2018.01)
*G06F 8/75* (2018.01)

(52) U.S. Cl.
CPC . *G06F 8/33* (2013.01); *G06F 8/75* (2013.01)

(58) Field of Classification Search
CPC .......................................................... G06F 8/33
See application file for complete search history.

(56) References Cited

U.S. PATENT DOCUMENTS 11,442,702 B2 * 9/2022 Smith .................. G06F 40/284
11,900,250 B2 * 2/2024 Wang ....................... G06N 3/08
12,008,341 B2 * 6/2024 Chen ......................... G06F 8/33
(Continued)

FOREIGN PATENT DOCUMENTS

EP 4524824 A1 * 3/2025 ............. G06N 20/00
WO 2020061586 A1 3/2020
(Continued)

OTHER PUBLICATIONS

Fan, Angela, et al. "Large language models for software engineering: Survey and open problems." 2023 IEEE/ACM International Conference on Software Engineering: Future of Software Engineering (ICSE-FoSE). IEEE, 2023.*
(Continued)

*Primary Examiner* — Francisco J Aponte
(74) *Attorney, Agent, or Firm* — Wade IP Law PLLC

(57) ABSTRACT

Some embodiments engineer a prompt for submission to a language model, such as a software development large language model. Some embodiments ascertain a relationship between code development information and potential context. Code development information includes static analysis results, project settings, development tool history or status data, and other software development data which augments training data previously embedded in the language model. Some embodiments compute a prompt inclusion score of the potential context, based on at least the relationship, and use the inclusion score to determine whether to include the potential context in the language model prompt. In some scenarios, an embodiment determines where to place the context in the prompt. Scoring is performed by a formula, statistical scoring model, or machine learning scoring model. Some embodiments reduce context inclusion false positives and false negatives that were based on the use of embedding similarity scores alone.

20 Claims, 3 Drawing Sheets

ENHANCED SYSTEM 102, 202 WITH FUNCTIONALITY 204 TO PRODUCE AN ENGINEERED PROMPT 208 WITH RELEVANT 226 INCLUDED CONTEXT 210, 212

CODE 214 DEVELOPMENT 216 INFORMATION 218

RELATIONSHIP 220 ASCERTAINER 222

SCORING MODEL 224

(56) References Cited

U.S. PATENT DOCUMENTS

| | | | | |
|---|---|---|---|---|
| 12,039,295 | B2 * | 7/2024 | Allamanis | G06F 8/427 |
| 12,039,304 | B2 * | 7/2024 | Groenewegen | G06N 5/01 |
| 12,106,318 | B1 * | 10/2024 | Chiang | G06Q 30/016 |
| 12,141,553 | B2 * | 11/2024 | Athiwaratkun | G06F 11/3684 |
| 12,283,291 | B1 * | 4/2025 | Sarfati | H04N 21/8106 |
| 12,530,173 | B1 * | 1/2026 | Buliani | G06F 8/34 |
| 12,554,938 | B2 * | 2/2026 | Gandhi | G06F 16/243 |
| 2020/0097261 | A1 * | 3/2020 | Smith | G06F 40/174 |
| 2021/0357187 | A1 * | 11/2021 | Clement | G06F 8/35 |
| 2022/0147321 | A1 * | 5/2022 | Svyatkovskiy | G06N 3/088 |
| 2023/0252224 | A1 * | 8/2023 | Tran | G06F 40/56 715/256 |
| 2023/0359903 | A1 * | 11/2023 | Cefalu | G06F 40/279 |
| 2023/0393817 | A1 * | 12/2023 | Johnson | G06N 3/0499 |
| 2023/0409290 | A1 * | 12/2023 | Duggal | G06Q 10/06311 |
| 2024/0095463 | A1 * | 3/2024 | Leary | G06F 40/284 |
| 2024/0202469 | A1 * | 6/2024 | Sharifi | G06F 40/35 |
| 2024/0362286 | A1 * | 10/2024 | He | G06F 16/93 |
| 2024/0379096 | A1 * | 11/2024 | Bose | G10L 15/10 |
| 2024/0412226 | A1 * | 12/2024 | Mathur | G06F 9/453 |
| 2024/0419917 | A1 * | 12/2024 | Clement | G06N 3/045 |
| 2025/0004915 | A1 * | 1/2025 | Rudenko | G06F 11/3604 |
| 2025/0005260 | A1 * | 1/2025 | Mansour | G06F 9/541 |
| 2025/0005263 | A1 * | 1/2025 | Mansour | G06F 40/134 |
| 2025/0007870 | A1 * | 1/2025 | Kim | G06F 16/954 |
| 2025/0045185 | A1 * | 2/2025 | Tang | G06F 11/3684 |
| 2025/0077204 | A1 * | 3/2025 | Guttridge | G06F 8/4435 |
| 2025/0103621 | A1 * | 3/2025 | Pan | G06F 16/3323 |
| 2025/0110975 | A1 * | 4/2025 | Shea | G06F 16/3329 |
| 2025/0117480 | A1 * | 4/2025 | Wagh | G06N 3/0455 |

FOREIGN PATENT DOCUMENTS

| | | | | |
|---|---|---|---|---|
| WO | WO-2023167731 | A1 * | 9/2023 | G06F 8/51 |
| WO | WO-2024073087 | A1 * | 4/2024 | G06F 16/3329 |

OTHER PUBLICATIONS

Shin, Jiho, et al. "Prompt engineering or fine tuning: An empirical assessment of large language models in automated software engineering tasks." arXiv preprint arXiv:2310.10508 (2023).*

Paul, Rishov, et al. "Enhancing automated program repair through fine-tuning and prompt engineering." arXiv preprint arXiv:2304.07840 (2023).*

"Code Understanding Dataset", retrieved from << https://artofservice.com.au/code-understanding-dataset/ >>, No. later than Sep. 21, 2023, 14 pages.

Nathan Hamiel, "The Brave New World of Degraded Performance", retrieved from << https://perilous.tech/2023/07/31/the-brave-new-world-of-degraded-performance/ >>, Jul. 31, 2023, 14 pages.

Janakiram MSV, "Prompt Engineering: Get LLMs to Generate the Content You Want", retrieved from << https://thenewstack.io/prompt-engineering-get-llms-to-generate-the-content-you-want/ >>, May 19, 2023, 13 pages.

Xin Cheng, "Large language models and Prompt Engineering", retrieved from << https://billtcheng2013.medium.com/large-language-models-and-prompt-engineering-1ffd381c10c5 >>, Jan. 30, 2023, 34 pages.

"Prompt engineering", retrieved from << https://en.wikipedia.org/wiki/Prompt_engineering >>, Sep. 21, 2023, 14 pages.

Albert Ziegler and John Berryman, "A developer's guide to prompt engineering and LLMs", retrieved from << https://github.blog/2023-07-17-prompt-engineering-guide-generative-ai-llms/ >>, Jul. 17, 2023, 16 pages.

"Jaccard index", retrieved from << https://en.wikipedia.org/wiki/Jaccard_index >>, Sep. 16, 2023, 10 pages.

Mahmoud Harmouch, "17 types of similarity and dissimilarity measures used in data science", retrieved from << https://towardsdatascience.com/17-types-of-similarity-and-dissimilarity-measures-used-in-data-science-3eb914d2681 >>, Mar. 13, 2021, 60 pages.

"Language model", retrieved from << https://en.wikipedia.org/wiki/Language_model >>, Sep. 19, 2023, 7 pages.

International Search Report and Written Opinion received for PCT Application No. PCT/US2024/048040, mailed on Jan. 14, 2025, 13 pages.

International Preliminary Report on Patentability (Chapter I) received for PCT Application No. PCT/US2024/048040 mailed on Date Apr. 23, 2026, 08 Pages.

* cited by examiner

ENHANCED SYSTEM 102, 202 WITH DEVELOPMENT INFO-AUGMENTED PROMPT ENGINEERING FUNCTIONALITY 204

MEMORY/MEDIA 112, 114

PROMPT CONTENT PRODUCER 302 TO COMPUTE INCLUSION SCORE 304 OF POTENTIAL CONTEXT 306, 212 USING DEVELOPMENT INFO 218

STATIC ANALYSIS 308 RESULT 310, 218

PROJECT 312 SETTING 314, 218

ENVIRONMENT 100 VARIABLE 316, 218

TOOL 122 DATA 318, 218

PROCESSOR 110

EMBEDDING SIMILARITY SCORE 320

INTERFACE(S) 322

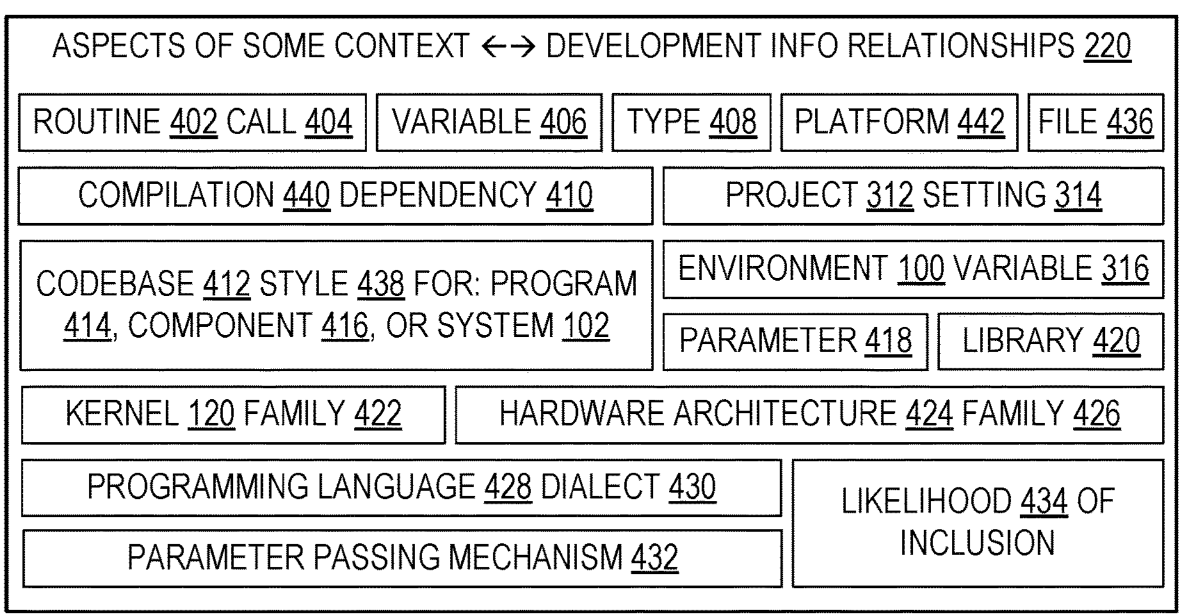
Fig. 4
SOME ASPECTS OF CONTEXT PROMPT INCLUSION SCORE 304 COMPUTATION
FORMULA 502: WEIGHTED 504 COMBINATION OF DIMENSION 506 VALUES 508
STATISTICAL SCORING MODEL 510, 224, E.G., USING REGRESSION 512
MACHINE LEARNING 514 SCORING MODEL 516, 224
MODEL 224 INPUT 518
RECENTLY / FREQUENTLY CHANGED 520 / 522
SIMILAR 524
PRIORITY 526
Fig. 5
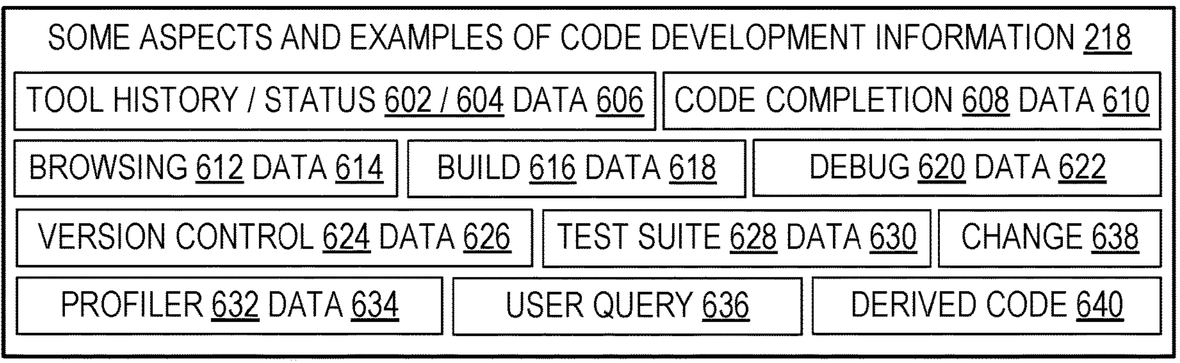
Fig. 6

SOFTWARE DEVELOPMENT LANGUAGE MODEL PROMPT ENGINEERING

BACKGROUND

A language model is a computational mechanism for generating text based on probabilities. A given language model is trained on texts written in one or more natural languages, such as English, Spanish, French, German, Arabic, Japanese, Chinese, Korean, German, Hindi, Greek, and so on (listed here in no particular order). Some language models are trained on programming language source code, on digital images, on digital sound files, or other kinds of data. Early language model technology was based largely or entirely on statistics, e.g., relative weights or likelihoods of certain text fragments. Statistical models were followed by recurrent neural network-based models, which were followed in turn by transformers, feedforward neural networks, and so-called "large" language models. Some language models combine two or more of these technologies, or include other computational technologies, or do both.

Language models are useful for computational tasks such as machine translation between natural languages, generation of text in natural languages, generation of source code text in programming languages, information retrieval, and many other computational tasks that involve communication efforts in written or spoken form. The capabilities of many language models depend at least in part on the training data which is used to train the model in question. The training data is embedded into the language model in an encoded form, so that more training on a given topic tends to produce a model which performs text generation better on that topic than another language model which is less well trained on the topic.

Many language models are designed to accept a textual prompt and then respond to the prompt with generated text. The content of the prompt is sometimes engineered in an effort to obtain better results from the language model. Prompt content is also referred to as "context" because it provides the language model with context for performing a task that is requested in the prompt. With some large language models, prompt engineering sometimes provides results that are similar to the results of embedded training. In some cases, prompt engineering provides even better results than embedded training alone. Because prompt engineering and embedded training are not mutually exclusive, many systems utilize both.

However, despite advances, prompt engineering and language models sometimes produce undesirable, irrelevant, or insufficient results. Accordingly, improvements in prompt engineering and in other technical areas involving language models would be beneficial.

SUMMARY

Some embodiments address technical challenges arising from efforts to engineer language model prompts for use in software development, e.g., prompts which contain software source code, or prompts that are intended to guide a language model's production of source code, or both. Determining which content to include in a software development language model prompt and which content to exclude from the prompt is challenging for various reasons, including the wide variety and large amount of information generally associated with a given software development project, prompt size constraints, the risk of subjectivity in determining content relevance, intellectual property control, and privacy protection.

Some embodiments provide or utilize computing technology which engineers a language model prompt for submission to a language model. One embodiment ascertains a relationship between a code development information and a potential context (a.k.a. potential content). The code development information includes, e.g., source code static analysis results, project settings such as development environment settings, development tool history data, development tool status data, or other software development data which augments the training data previously embedded in the language model. The embodiment computes a prompt inclusion score of the potential context, based on at least the relationship, and determines whether to include the potential context in the language model prompt, based on at least the prompt inclusion score. In some scenarios, an embodiment determines where to place the context in the prompt. The embodiment includes the potential context in the language model prompt or does not include the potential context in the prompt, based on at least a result of the determining.

Other technical activities and characteristics pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. Subject matter scope is defined with claims as properly understood, and to the extent this Summary conflicts with the claims, the claims should prevail.

BRIEF DESCRIPTION OF THE DRAWINGS

A more particular description will be given with reference to the attached drawings. These drawings only illustrate selected aspects and thus do not fully determine coverage or scope.

FIG. 4 is a block diagram illustrating some aspects of relationships between potential context and code development information;

FIG. 5 is a block diagram illustrating some aspects of context prompt inclusion score computation;

FIG. 6 is a block diagram illustrating some aspects and examples of code development information;

DETAILED DESCRIPTION

Overview

Figures 1, 2, 3:
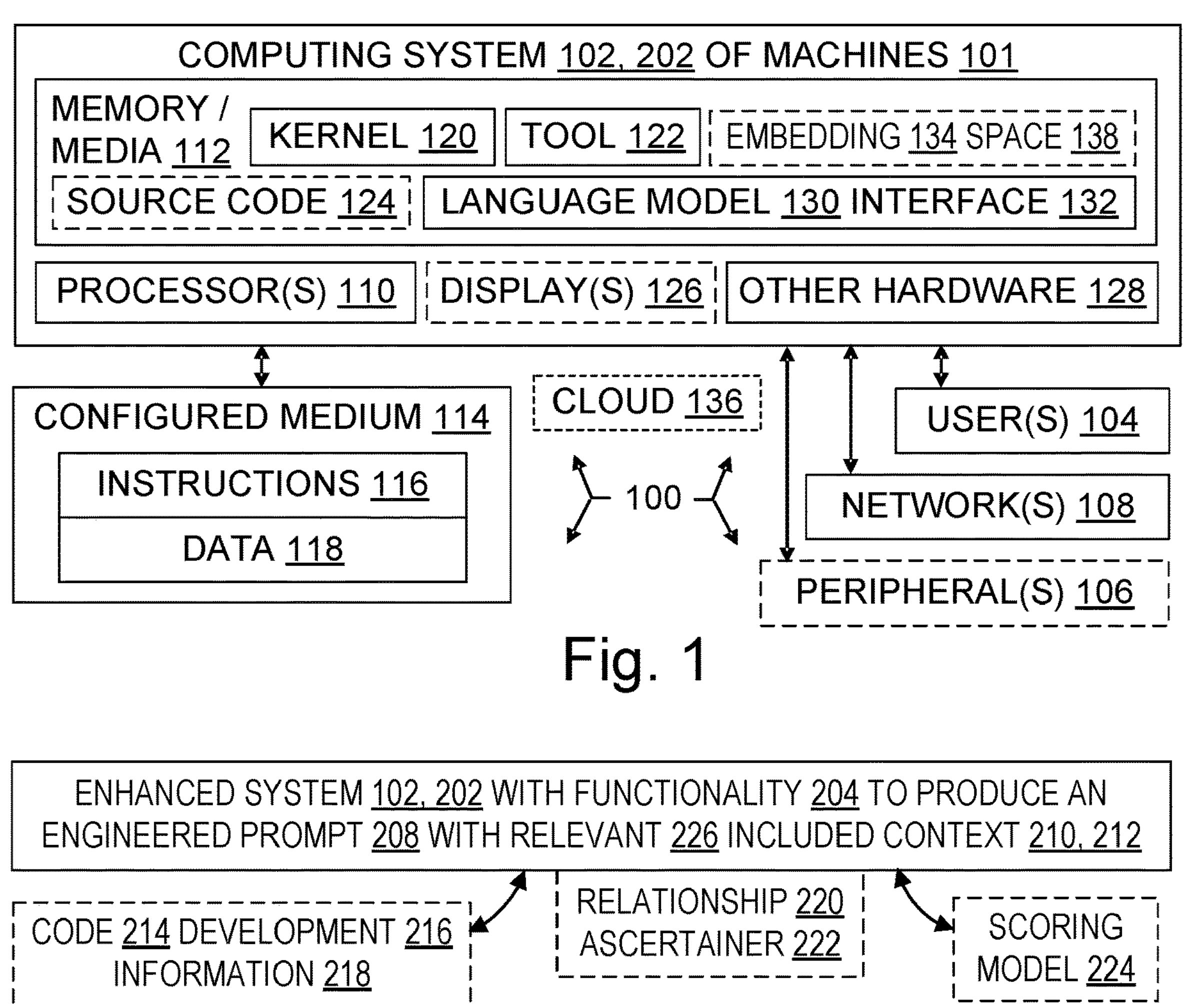
FIG. 1 is a diagram illustrating aspects of computer systems and also illustrating configured storage media, including some aspects generally suitable for systems which provide code development information-augmented language model prompt engineering functionality (a.k.a. prompt engineering functionality herein)
FIG. 2 is a block diagram illustrating aspects of a family of enhanced systems which are each configured with prompt engineering functionality.
FIG. 3 is a block diagram illustrating aspects of another family of systems which are each enhanced with prompt engineering functionality.

Some teachings described herein were motivated by technical challenges faced during efforts to improve technology for software development tools using the C++ programming language. Some programs utilizing C++ have relatively large codebases in comparison with programs utilizing other programming languages, but some large language models have been trained less on C++ code than on code written in other programming languages, and therefore these models do not appear to reason as well about C++ code. These and other challenges were motivations for some of the present improvements in prompt engineering, but the teachings herein are not limited in their scope or applicability to the particular motivational challenges, or to any particular programming language, development tool, language model, codebase, phase of a software development lifecycle, or natural language.

One challenge when crafting a prompt to be submitted to a language model to facilitate software development is how to determine which content is eligible to be considered for possible inclusion in the prompt; this is the "potential content". Even if the potential content is limited to source code, the amount of potential content is enormous. Without some constraints, the potential content for a prompt about a program that is being developed could include the entire source codebase of the program, the entire source codebase of every library that is or could be called from that program, and much if not all of the source codebase of any kernel that provides or will provide services to that program. This is much more information than will fit within the few thousand tokens permitted in a typical language model prompt. Moreover, even if all of the source codebases did fit in the prompt, or in a sequence of prompts, much of that content would be largely or entirely irrelevant to the task identified in the prompt. As a result, the language model that is fed the prompt would consume substantial resources processing data that had little or no positive impact on the language model's output.

Another challenge of crafting a prompt to a language model to facilitate software development is how to determine which part of the potential content will actually be included in the prompt. The relevance of any piece of potential content is variable and dependent on circumstances. In human activity, relevance is generally a subjective judgment. But subjectivity is removed from automatic prompt engineering, to provide consistent results efficiently and effectively using computational activity instead of subjective human judgments. Some potential content is usually more relevant than other potential content, and is therefore more likely to produce desired language model output if it is included in the prompt. But it has not been clear how to determine, in an efficient and effective automatic manner, the likely relevance of any given piece of potential content for a particular prompt.

Some embodiments described herein provide or utilize a method of engineering a language model prompt for submission to a language model. The method is performed by a computing system, and includes: ascertaining a relationship between a code development information which is associated with a source code, and a potential context, at least a portion of the potential context or the prompt having a precomputed embedding in an embedding space of the language model; computing a prompt inclusion score of the potential context, based on at least the relationship; determining whether to include the potential context in the language model prompt, based on at least the prompt inclusion score; and including the potential context in the language model prompt or not including the potential context in the language model prompt, based on at least a result of the determining. This method has the technical benefit of augmenting a language model's embedded data with code development information that is scored as relevant and is based on a relationship with the embedded data. This tends to improve the accuracy, specificity, and currency of the language model's output.

In some embodiments, the code development information includes at least one of: a result of a static analysis of at least part of the source code; a project setting of a software development project which includes at least part of the source code or includes a derived code which is derived from at least part of the source code; or an environment variable of a computing environment which includes at least part of the source code or includes a derived code which is derived from at least part of the source code. This constraint has the technical benefit of objectively determining which content will be considered for possible inclusion in the prompt, thereby avoiding inefficient and ineffective language model processing of content that would have had little or no positive impact on the language model's output. For example, library source code that is not related to a prompt's query by static analysis results or development environment settings does not take up space in the prompt. This constraint also has the technical benefit of including in the prompt relevant content that is not merely cumulative of the language model's embedded data.

In some embodiments, the code development information includes at least one of: a code completion data representing a code completion; a browsing data representing a browsing history or a browsing status; a build data representing a software build history or a software build status; a debug data representing a software debug history or a software debug status; a test suite data representing a test suite history or a test suite status; a profiler data representing a profiler history or a profiler status; or a version control data representing a software version control history or a software version control status. This constraint has the technical benefit of objectively determining which content will be considered for possible inclusion in the prompt, thereby avoiding inefficient and ineffective language model processing of content that would have had little or no positive impact on the language model's output. For example, developer forum musings that are not related to a prompt's query by actual development efforts do not take up space in the prompt. This constraint also has the technical benefit of including in the prompt relevant content that is not merely cumulative of the language model's embedded data, which helps improve the accuracy, currency, and specificity of the model's output.

In some embodiments, the computing of the prompt inclusion score of the potential context and the determining based on at least the prompt inclusion score are performed while the source code is open for editing in an editor. This scenario illustrates the technical benefit of providing engineered prompts to large language models or other language models while source code is being edited. For example, in some cases the language model generates a candidate refactoring or another code snippet which is presented in an editor while a developer is working on the source code, thereby making software development more efficient and productive.

In some embodiments, the prompt inclusion score of the potential context corresponds to a greater likelihood of inclusion of the potential context in the prompt than a likelihood of inclusion which depends only on an embedding similarity score that represents similarity of the potential context to the user query in the embedding space. As a technical benefit, this greater likelihood of inclusion improves the prompt by giving the language model relevant context that it would not otherwise have received.

In one example, a C++ macro is used instead of directly naming a type in a routine. During compilation, the C++ preprocessor would expand the macro to the actual type, which would then be seen by the compiler. Static analysis results indicate this dependency. An inclusion score increase due to the static analysis results makes it more likely an embodiment will include the definition of the type as context in the prompt, whereas relying only on embedding similarity for relevance assessment would have made it less likely that the connection between the macro and the type is recognized by a prompt generator and then included in the prompt.

In some embodiments, the prompt inclusion score of the potential context corresponds to a lesser likelihood of inclusion of the potential context in the prompt than a likelihood of inclusion which depends only on an embedding similarity score that represents similarity of the potential context to the user query in the embedding space. As a technical benefit, this lesser likelihood of inclusion improves the prompt by freeing the language model from processing less relevant or irrelevant context that it would have received otherwise.

In one example, a utility function was copy-pasted between some independent subprojects in a larger project. Without the code development information, a relevance assessment based only on embedding similarity is likely to view all definitions and references to all the copy-pasted utility function instances as similar. However, with the code development information, the lower inclusion score makes it less likely an embodiment will include context from the subprojects that are not the subproject the user is currently editing, because static analysis would find no relationship between these subprojects.

In some embodiments, obtaining code development information includes getting a value of an environment variable of a computing environment which includes at least part of the source code or a derived code which is derived from at least part of the source code, and establishing that the value of the environment variable is not a default value of the environment variable. This functionality has the technical benefit of improving the prompt by giving the language model relevant context that it would not otherwise have received, or excluding low relevance context, or both, because non-default values of environment variables are more likely to be relevant than default values.

Some embodiments tend to reduce fabulations from language models, because the use of external information such as static analysis results, actual project settings, and actual tool history and status data, help ground context selection. The context placed in a prompt includes detailed facts that are part of the current development environment in which the prompt is being created.

These and other benefits will be apparent to one of skill from the teachings provided herein.

Operating Environments

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud 136. An individual machine is a computer system, and a network or other group of cooperating machines is also a computer system. A given computer system 102 may be configured for end-users, e.g., with applications, for administrators, as a server, as a distributed processing node, and/or in other ways.

Human users 104 sometimes interact with a computer system 102 user interface by using displays 126, keyboards 106, and other peripherals 106, via typed text, touch, voice, movement, computer vision, gestures, and/or other forms of I/O. Virtual reality or augmented reality or both functionalities are provided by a system 102 in some embodiments. A screen 126 is a removable peripheral 106 in some embodiments and is an integral part of the system 102 in some embodiments. The user interface supports interaction between an embodiment and one or more human users. In some embodiments, the user interface includes one or more of: a command line interface, a graphical user interface (GUI), natural user interface (NUI), voice command interface, or other user interface (UI) presentations, presented as distinct options or integrated.

System administrators, network administrators, cloud administrators, security analysts and other security personnel, operations personnel, developers, testers, engineers, auditors, and end-users are each a particular type of human user 104. In some embodiments, automated agents, scripts, playback software, devices, and the like running or otherwise serving on behalf of one or more humans also have user accounts, e.g., service accounts. Sometimes a user account is created or otherwise provisioned as a human user account but in practice is used primarily or solely by one or more services; such an account is a de facto service account. Although a distinction could be made, "service account" and "machine-driven account" are used interchangeably herein with no limitation to any particular vendor.

Storage devices or networking devices or both are considered peripheral equipment in some embodiments and part of a system 102 in other embodiments, depending on their detachability from the processor 110. In some embodiments, other computer systems not shown in FIG. 1 interact in technological ways with the computer system 102 or with another system embodiment using one or more connections to a cloud 136 and/or other network 108 via network interface equipment, for example.

Each computer system 102 includes at least one processor 110. The computer system 102, like other suitable systems, also includes one or more computer-readable storage media 112, also referred to as computer-readable storage devices 112. In some embodiments, tools 122 include security tools or software applications, on mobile devices 102 or workstations 102 or servers 102, editors, compilers, debuggers and other software development tools, as well as APIs, browsers, or webpages and the corresponding software for protocols such as HTTPS, for example. Files, APIs, endpoints, and other resources may be accessed by an account or set of accounts, user 104 or group of users 104, IP address or group of IP addresses, or other entity. Access attempts may present passwords, digital certificates, tokens or other types of authentication credentials.

Storage media 112 occurs in different physical types. Some examples of storage media 112 are volatile memory, nonvolatile memory, fixed in place media, removable media, magnetic media, optical media, solid-state media, and other types of physical durable storage media (as opposed to merely a propagated signal or mere energy). In particular, in some embodiments a configured storage medium 114 such as a portable (i.e., external) hard drive, CD, DVD, memory stick, or other removable nonvolatile memory medium becomes functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory nor a computer-readable storage device is a signal per se or mere energy under any claim pending or granted in the United States.

The storage device 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as events manifested in the system 102 hardware, product characteristics, inventories, physical measurements, settings, images, readings, volumes, and so forth. Such data is also transformed by backup, restore, commits, aborts, reformatting, and/or other technical operations.

Although an embodiment is described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, some embodiments include one of more of: chiplets, hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. In some embodiments, components are grouped into interacting functional modules based on their inputs, outputs, or their technical effects, for example.

In addition to processors 110 (e.g., CPUs, ALUs, FPUs, TPUs, GPUS, and/or quantum processors), memory/storage media 112, peripherals 106, and displays 126, some operating environments also include other hardware 128, such as batteries, buses, power supplies, wired and wireless network interface cards, for instance. The nouns "screen" and "display" are used interchangeably herein. In some embodiments, a display 126 includes one or more touch screens, screens responsive to input from a pen or tablet, or screens which operate solely for output. In some embodiments, peripherals 106 such as human user I/O devices (screen, keyboard, mouse, tablet, microphone, speaker, motion sensor, etc.) will be present in operable communication with one or more processors 110 and memory 112.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which are present in some computer systems. In some, virtualizations of networking interface equipment and other network components such as switches or routers or firewalls are also present, e.g., in a software-defined network or a sandboxed or other secure cloud computing environment. In some embodiments, one or more computers are partially or fully "air gapped" by reason of being disconnected or only intermittently connected to another networked device or remote cloud. In particular, prompt engineering functionality 204 could be installed on an air gapped network and then be updated periodically or on occasion using removable media 114, or not updated at all. Some embodiments also communicate technical data or technical instructions or both through direct memory access, removable or non-removable volatile or nonvolatile storage media, or other information storage-retrieval and/or transmission approaches.

One of skill will appreciate that the foregoing aspects and other aspects presented herein under "Operating Environments" form part of some embodiments. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but interoperate with items in an operating environment or some embodiments as discussed herein. It does not follow that any items which are not in outline or parenthetical form are necessarily required, in any Figure or any embodiment. In particular, FIG. 1 is provided for convenience; inclusion of an item in FIG. 1 does not imply that the item, or the described use of the item, was known prior to the current disclosure.

In any later application that claims priority to the current application, reference numerals may be added to designate items disclosed in the current application. Such items may include, e.g., software, hardware, steps, processes, systems, functionalities, mechanisms, data structures, computational resources, programming languages, tools, workflows, or algorithm implementations, or other items in a computing environment, which are disclosed herein but not associated with a particular reference numeral herein. Corresponding drawings may also be added.

More About Systems

FIG. 2 illustrates a computing system 102 configured by one or more of the prompt engineering functionality enhancements taught herein, resulting in an enhanced system 202. In some embodiments, this enhanced system 202 includes a single machine, a local network of machines, machines in a particular building, machines used by a particular entity, machines in a particular datacenter, machines in a particular cloud, or another computing environment 100 that is suitably enhanced. FIG. 2 items are discussed at various points herein, and additional details regarding them are provided in the discussion of a List of Reference Numerals later in this disclosure document.

FIG. 3 shows some aspects of some enhanced systems 202. This is not a comprehensive summary of all aspects of enhanced systems 202 or all aspects of prompt engineering functionality 204. Nor is it a comprehensive summary of all aspects of an environment 100 or system 202 or other context of an enhanced system 202, or a comprehensive summary of any aspect of functionality 204 for potential use in or with a system 102. FIG. 3 items are discussed at various points herein, and additional details regarding them are provided in the discussion of a List of Reference Numerals later in this disclosure document.

FIG. 4 shows some aspects of relationships 220 between a prompt 208 (in some cases a draft or otherwise incomplete prompt 208) or code development information 218 on the one hand, and potential context 306, on the other hand. This is not a comprehensive summary of all aspects of relationships 220. FIG. 4 items are discussed at various points herein, and additional details regarding them are provided in the discussion of a List of Reference Numerals later in this disclosure document.

FIG. 5 shows some aspects of prompt inclusion scores 304 and their computation. This is not a comprehensive summary of all aspects of prompt inclusion scores 304. FIG. 5 items are discussed at various points herein, and additional details regarding them are provided in the discussion of a List of Reference Numerals later in this disclosure document.

FIG. 6 shows some aspects and examples of code development information 218. This is not a comprehensive summary of all aspects of code development information 218. FIG. 6 items are discussed at various points herein, and additional details regarding them are provided in the discussion of a List of Reference Numerals later in this disclosure document.

Figure 7:
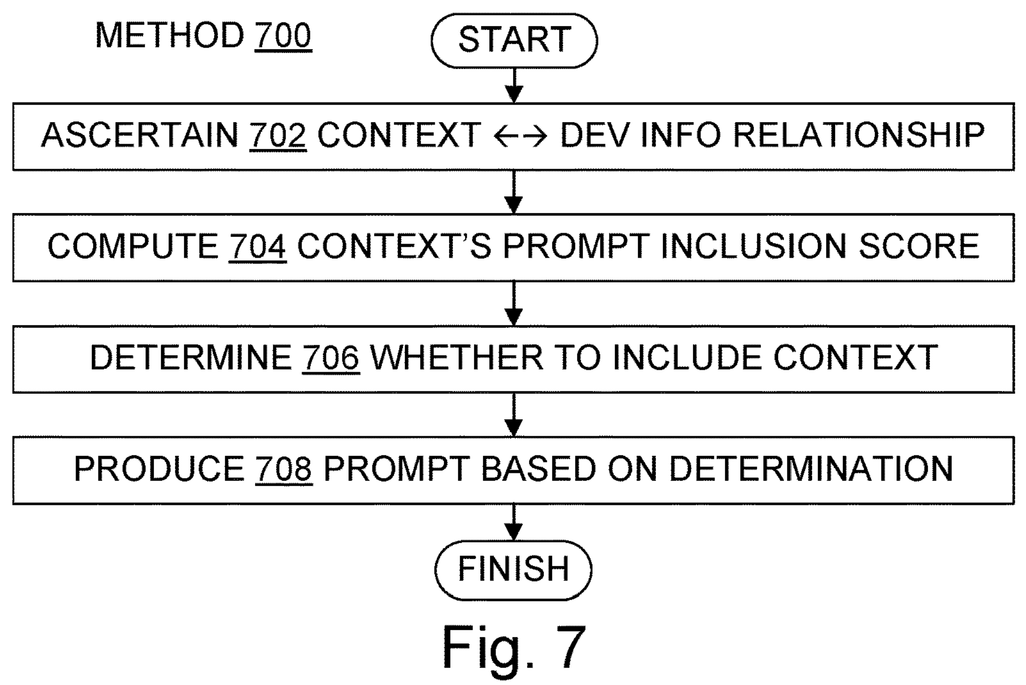
FIG. 7 is a flowchart illustrating steps in a prompt engineering method.
Figure 8:
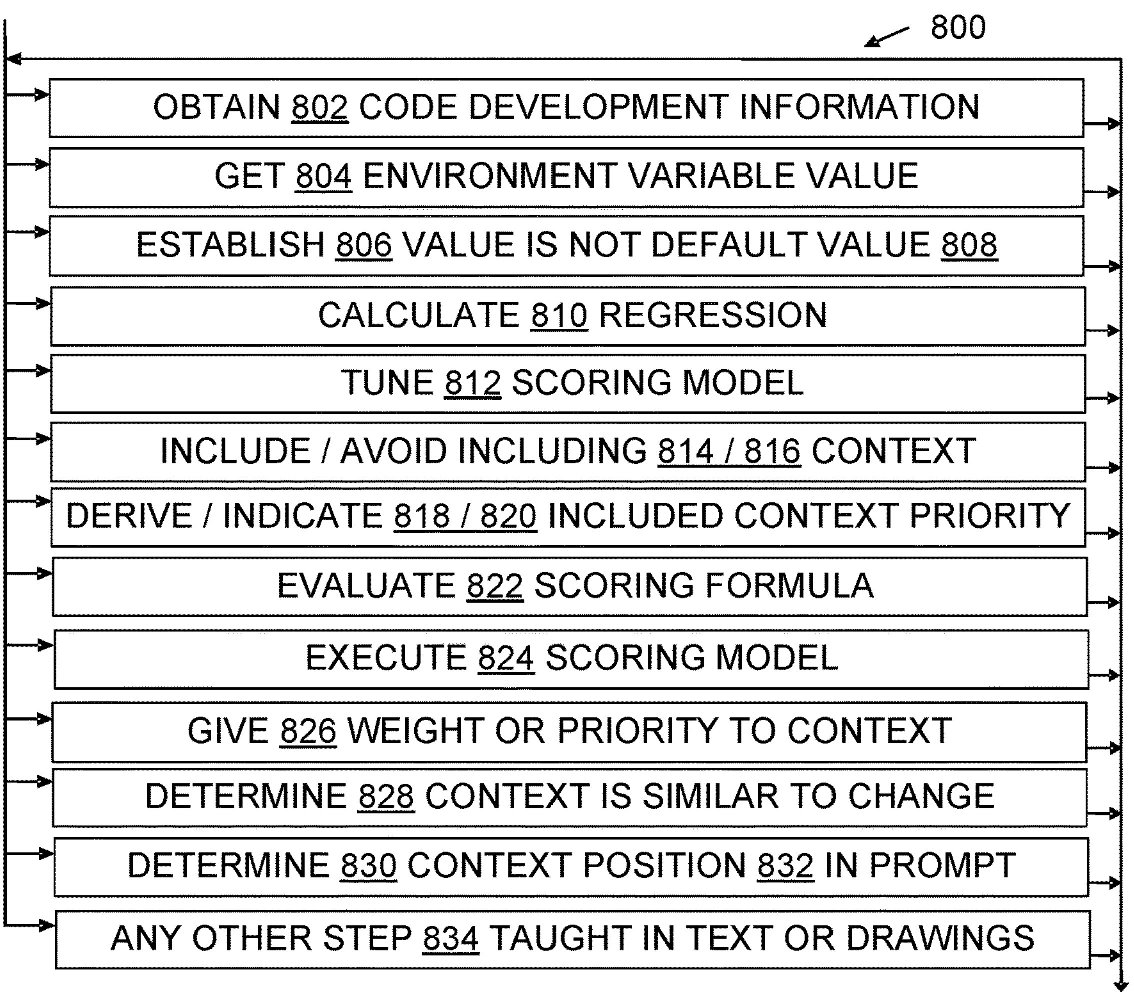
FIG. 8 is a flowchart further illustrating steps in some prompt engineering methods, and incorporating FIG. 7.

The other figures are also relevant to systems 202. FIGS. 7 and 8 illustrate methods of prompt engineering functionality 204 operation in systems 202.

In some embodiments, the enhanced system 202 is networked through an interface 322. In some, an interface 322 includes hardware such as network interface cards, software such as network stacks, APIs, or sockets, combination items such as network connections, or a combination thereof.

Some embodiments include a computing system 202 which is configured to produce an engineered language model 130 prompt 208. The computing system includes: a digital memory 112, and a processor set 110 including at least one processor, the processor set in operable communication with the digital memory. The system 202 also includes a language model prompt content producer 302. The language model prompt content producer 302 is configured to, upon execution by the processor set, obtain 802 code development information 218 which is associated with a source code 124, ascertain 702 a relationship between the code development information and a potential context 306, at least a portion of the potential context 306 or the prompt 208 having a precomputed embedding 134 in an embedding space 138 of the language model 130, compute 704 a prompt inclusion score 304 of the potential context, based on at least the relationship, and determine 706, based on at least the prompt inclusion score, whether to include the potential context in the language model prompt, or determine 830 where to position the potential context in the language model prompt, and produce 708 the language model prompt consistent with the prompt inclusion score.

The source code 124 is presumptively relevant. Unless indicated otherwise, the source code 124 is or will be part of the current prompt 208, or is part of a previous prompt that is referenced by the current prompt.

In some embodiments, the code development information 218 includes at least one of: a result 310 of a static analysis 308 of at least part of the source code 124; a project setting 314 of a software development project 312 which includes at least part of the source code 124 or includes a derived code 640 which is derived from at least part of the source code; or an environment variable 316 of a computing environment 100 which includes at least part of the source code 124 or includes a derived code 640 which is derived from at least part of the source code.

In some embodiments, the code development information 218 includes at least one of: a code completion data 610 representing a code completion 608; a browsing data 614 representing a browsing history 602 or a browsing status 604; a build data 618 representing a software build history 602 or a software build status 604; a debug data 622 representing a software debug history 602 or a software debug status 604; a test suite data 630 representing a test suite history 602 or a test suite status 604; a profiler data 634 representing a profiler history 602 or a profiler status 604; or a version control data 626 representing a software version control history 602 or a software version control status 604.

In one example, an inclusion score 304 of a potential context 306 that includes a type 408 is increased because a list 610 of code completion suggestions in the code development information 218 identifies the type 408, even though the source code 124 in the user query 636 does not recite the type 408. In another example, an inclusion score 304 of a potential context 306 that includes a routine call 404 foo( ) is decreased because a code completion suggestion list 610 in the code development information 218 recites foobar( ) and does not recite foo( ).

More generally, in some cases a potential context has a high embedding similarity to a user query but is not actually referenced in code development terms, e.g., they are not in a shared call chain, and there is no compiler dependency. As a result, the potential context's combined score 304 is lower than it would have been if it were based on embedding similarity alone.

In one example, respective inclusion scores 304 of several potential contexts 306 that each involve a term "exception" are increased because a software debug history 602 or a software debug status 604 in the code development information 218 indicates that a program 640 built with the source code has been debugged after an exception occurred during program execution.

In one example, respective inclusion scores 304 of several potential contexts 306 that each involve a term "speed", "optimize", or "performance" are increased because a profiler history 602 or a profiler status 604 in the code development information 218 indicates that a program 640 built with the source code has been performance profiled.

In some embodiments, the prompt inclusion score 304 of the potential context 306 corresponds to a greater likelihood 434 of inclusion of the potential context in the prompt than a likelihood of inclusion which depends only on an embedding similarity score 320 that represents similarity 524 of the potential context to the user query 636 in the embedding space 138.

For example, in some cases the code development information 218 reveals a connection between the source code and a potential context that is not apparent from the text of the source code in and of itself, and that connection increases the relevance of the potential context. Some connections involve macro expansion, other preprocessor functionality, a chain of routine calls, a sequence of class or other type definitions, build files, or development tool history, for example.

In some embodiments, the prompt inclusion score 304 of the potential context 306 corresponds to a lesser likelihood 434 of inclusion of the potential context in the prompt than a likelihood of inclusion which depends only on an embedding similarity score 320 that represents similarity 524 of the potential context to the user query 636 in the embedding space 138.

For example, in some cases the same or similar text appears in the source code and in a potential context, but the code development information 218 indicates the occurrences are coincidental, or at least not part of any connection found through static analysis. This tends to decrease the relevance of the potential context.

In some embodiments, the language model prompt content producer 302 includes a statistical scoring model 510, the statistical scoring model having inputs 518, the inputs including at least the precomputed embedding 134 or an embedding similarity value 320 which depends on at least the precomputed embedding, the inputs 518 also including at least a portion of the code development information 218.

In some embodiments, the language model prompt content producer 302 includes a machine learning scoring model 516, the machine learning scoring model having inputs 518, the inputs including at least the precomputed embedding 134 or an embedding similarity value 320 which depends on at least the precomputed embedding, the inputs 518 also including at least a portion of the code development information 218.

Other system embodiments are also described herein, either directly or derivable as system versions of described processes or configured media, duly informed by the extensive discussion herein of computing hardware.

Although specific prompt engineering architecture examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided in this disclosure to help illustrate aspects of the technology, but the examples given within this document do not describe all of the possible embodiments. A given embodiment may include additional or different kinds of prompt engineering functionality, for example, as well as different technical features, aspects, mechanisms, software, expressions, operational sequences, commands, data structures, programming environments, execution environments, environment or system characteristics, or other functionality consistent with teachings provided herein, and may otherwise depart from the particular examples provided.

Processes (a.k.a. Methods)

Processes (which are also be referred to as "methods" in the legal sense of that word) are illustrated in various ways herein, both in text and in drawing figures. FIGS. 7 and 8 each illustrate a family of methods 700 and 800 respectively, which are performed or assisted by some enhanced systems, such as some systems 202 or another prompt engineering functionality enhanced system as taught herein. Method family 700 is a proper subset of method family 800.

Some variations on FIG. 7 exclude producing 708 a prompt based on inclusion scores, but store potential contexts and their respective inclusion scores for possible later submission to another mechanism which then produces the prompt. That is, in some embodiments some or all of the inclusion scores are computed and then cached without necessarily being subsequently used during prompt production. Some variations on FIG. 7 include obtaining 802 the code development information before ascertaining 702 its relation, if any, to any of the potential contexts. These are merely examples of variations; as noted elsewhere, any operable combination of steps that are disclosed herein may be part of a given embodiment.

FIGS. 1 to 6 illustrate prompt engineering system 202 architectures with implicit or explicit actions, e.g., executing static analysis tools 122, querying an integrated development environment or shell or repository or other software to obtain code development information 218, querying a database or a language model or searching a set of training data to identify potential contexts 210, receiving source code and user queries and other prompt content via a user interface or a tool API, sending inputs to a scoring model and receiving as an output a score 304 from the scoring model 224, and otherwise processing data 118, in which the data 118 includes, e.g., source code 124, potential or included prompt content 212, tool 122 data 318 such as settings 314, history 602, and status 604, other code development information 218, inclusion scores 304, and prompts 208, among other examples disclosed herein.

Technical processes shown in the Figures or otherwise disclosed will be performed automatically, e.g., by an enhanced system 202, unless otherwise indicated. Related non-claimed processes may also be performed in part automatically and in part manually to the extent action by a human person is implicated, e.g., in some situations a human 104 types or speaks a query or other request in a natural language, which is captured in the system 202 as digital text. Natural language means a language that developed naturally, such as English, French, German, Hebrew, Hindi, Japanese, Korean, Spanish, etc., as opposed to designed or constructed languages such as C++, HTML, shell script, Python, SQL, JavaScript® (mark of Oracle America, Inc.), or the like, which are all designated here for convenience as programming languages 428. Regardless, no process contemplated as an embodiment herein is entirely manual or purely mental; none of the claimed processes can be performed solely in a human mind or on paper. Any claim interpretation to the contrary is squarely at odds with the present disclosure.

In a given embodiment zero or more illustrated steps of a process may be repeated, perhaps with different parameters or data to operate on. Steps in an embodiment may also be done in a different order than the top-to-bottom order that is laid out in FIG. 8. FIG. 8 is a supplement to the textual examples of embodiments provided herein and the textual descriptions of embodiments provided herein. In the event of any alleged inconsistency, lack of clarity, or excessive breadth due to an aspect or interpretation of FIG. 8, the text of this disclosure shall prevail over that aspect or interpretation of FIG. 8.

Arrows in process or data flow figures indicate allowable flows; arrows pointing in more than one direction thus indicate that flow may proceed in more than one direction. Steps may be performed serially, in a partially overlapping manner, or fully in parallel within a given flow. In particular, the order in which flowchart 800 action items are traversed to indicate the steps performed during a process may vary from one performance instance of the process to another performance instance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim of an application or patent that includes or claims priority to the present disclosure. To the extent that a person of skill considers a given sequence S of steps which is consistent with FIG. 8 to be non-operable, the sequence S is not within the scope of any claim. Any assertion otherwise is contrary to the present disclosure.

Some embodiments provide or utilize a prompt engineering method 800 performed by a computing system 202. In this discussion and generally elsewhere herein, "method" is used in the legal sense and "process" is used in the computer science sense. The prompt engineering method, which engineers a language model prompt 208 for submission to a language model, includes at least: ascertaining 702 a relationship 220 between a code development information 218 which is associated with a source code 124, and a potential context 306. Unless indicated otherwise, the source code 124 is or will be part of the current prompt 208 or is part of a previous prompt that is referenced by the current prompt. At least a portion of the potential context or the prompt has a precomputed embedding 134 in an embedding space 138 of the language model 130. This prompt engineering method also includes computing 704 a prompt inclusion score 304 of the potential context, based on at least the relationship, determining 706 whether to include the potential context in the language model prompt, based on at least the prompt inclusion score, and then either including 814 the potential context in the language model prompt or not 816 including the potential context in the language model prompt, based on at least a result of the determining.

In some embodiments, the code development information 218 includes a result of a static analysis 308 of at least part of the source code.

In some embodiments, the relationship 220 indicates at least one of the following circumstances:

(routine calls routine, e.g., function calls function) a first routine 402 identified in the code development information is configured to upon execution call a second routine 402 identified in the potential context; or a first routine 402 identified in the potential context is configured to upon execution call a second routine 402 identified in the code development information; or (routine references type) a routine 402 identified in the code development information references a type 408 identified in the potential context; or a routine 402 identified in the potential context references a type 408 identified in the code development information; or (source code statement references variable) a source code statement 124 identified in the code development information references a variable 406 identified in the potential context; or a source code statement 124 identified in the potential context references a variable 406 identified in the code development information; or (file depends on file to compile) a first file 436 identified in the code development information has a compilation dependency 410 on a second file 436 identified in the potential context; or a second file 436 identified in the potential context has a compilation dependency 410 on a first file 436 identified in the code development information; or (project references project setting) a software development project 312 identified in the code development information references a software development project setting 314 identified in the potential context; or a software development project 312 identified in the potential context references a software development project setting 314 identified in the code development information; or (environment references environment variable) a computing environment 100 identified in the code development information references an environment variable 316 identified in the potential context; or a computing environment 100 identified in the potential context references an environment variable 316 identified in the code development information.

In an example of a "routine calls routine" circumstance, a routine alpha1( ) identified in the potential context is configured to upon execution call a routine beta1( ) identified in the code development information. In another example of a "routine calls routine" circumstance, a routine alpha2( ) identified in the code development information is configured to upon execution call a routine beta2( ) identified in the potential context. Note that the identification of a routine in the code development information does not necessarily mean that the routine is recited literally in a source code of a user query, because preprocessor operation analysis or other static analysis sometimes discloses a connection between routines that is not evident within the source code on its own. Likewise, static analysis 308 sometimes discloses a connection between a routine 402 and a type 408 that is not evident within the query source code considered only in isolation from static analysis results 310.

In an example of a "file depends on file to compile" circumstance, a file main.cpp identified in the code development information has a compilation dependency on (e.g., calls on or includes via a preprocessor directive) a file foolib.cpp which in turn has a compilation dependency on a file barlib.cpp. The query source code does not recite "barlip.cpp". The potential context does identify "barlip.cpp", so an effect of the compilation dependency is an increase in the relevance (as indicated by the inclusion score) of the barlip.cpp file as a potential context.

In some embodiments, the relationship 220 indicates at least one of the following circumstances:

(files target the same platform, e.g., same kernel or same processor architecture) a file 436 identified in the code development information targets a platform 442, and a file 436 identified in the potential context also targets the same platform 442, wherein the platform is distinguished from other platforms by at least one of: a kernel family 422, or a processor hardware architecture family 426; or (files are from the same codebase) a file 436 identified in the code development information belongs to a codebase 412, and a file 436 identified in the potential context also belongs to the same codebase 412, wherein the codebase 412 includes a collection of source codes 124 identified for use in building a particular software program 414, a particular computing system component 416, or a particular computing system 102; or (files use the same library) a file 436 identified in the code development information is part of a software library 420 or depends on the software library 420, and a file 436 identified in the potential context also is part of the software library 420 or depends on the software library 420; or (source codes or tools for the same dialect) a portion of source code 124 or a tool 122 identified in the potential context targets a particular dialect 430 of a programming language 428, and a portion of source code 124 or a tool 122 identified in the code development information also targets the same particular dialect 430 of the programming language 428; or (source codes or tools or project with the same codebase architecture) a portion of source code 124 or a tool 122 or a project 312 identified in the potential context targets a particular codebase architecture 438, and a portion of source code 124 or a tool 122 or a project 312 identified in the code development information also targets the same particular codebase architecture 438; or (same parameter passing mechanism 432) a routine parameter 418 identified in the potential context is passed by reference, and a routine parameter 418 identified in the code development information is also passed by reference; or a routine parameter 418 identified in the potential context is passed by value, and a routine parameter identified in the code development information is also passed by value.

In an example of a "source codes or tools or project with the same codebase architecture" circumstance, a project 312 identified in the potential context targets a Django Python framework (a.k.a. codebase architecture or codebase style) 438, and a source code 124 identified in the code development information also targets the same Django Python codebase architecture 438. Accordingly, the inclusion score of the project is increased even when the potential context does not list any source code that overlaps the query source code.

In some embodiments, computing 704 a prompt inclusion score 304 of the potential context includes at least one of: evaluating 822 a formula which includes a weighted sum of dimension values 508, each dimension value corresponding to a respective piece of the code development information 218 or else corresponding to a respective potential context 306; executing 824 a statistical scoring model 224; executing 824 a machine learning scoring model 224; giving 826 a greater weight 504 or a higher priority 526 to a most recently changed potential context; giving 826 a greater weight 504 or a higher priority 526 to a most frequently changed potential context; or giving 826 a greater weight 504 or a higher priority 526 to a potential context in response to determining that a change 638 involving the potential context is within a predefined threshold of similarity 524 to a change 638 indicated in the code development information.

In an example of evaluating 822 a formula which includes a weighted sum of dimension values 508, one embodiment computes an inclusion score IS of a potential context as follows:

$$IS = 0.6^{*}ES + 0.4^{*}SA,$$

where ES is the embedding similarity score 320 of the potential context, which in this example is in the range from 0.0 (no similarity) to 1.0 (maximum similarity), and SA is a static analysis result value, which is 1.0 if the potential context item (e.g., routine name, type name, variable name) appears in a result of static analysis of the file containing the source code 124 and 0.0 otherwise.

Continuing this example, assume an inclusion score threshold is set at 0.6. Then the potential context would be included (space permitting) in the prompt if it has maximum embedding similarity to the query source code, regardless of static analysis results. The potential context would also be included if it appears in the static analysis result (worth 0.4) and also has at least a 0.3333 (to whatever precision) embedding similarity (worth 0.2). Of course, these choices are merely part of one example. In a given embodiment, more or different dimensions 506, different dimension weights 504, or both, are part of the formula 502, and a different threshold is also used in some embodiments. Also, the example formula is a weighted sum, but other weighted numerical calculations are used in some embodiments.

In some embodiments, computing 704 a prompt inclusion score of the potential context includes executing 824 a scoring model 224, and the method further includes tuning 812 the scoring model. Tuning a scoring model may include, e.g., experimentation to optimize model hyperparameter values, or unfreezing a top layer and jointly training the unfrozen top layer with a newly-added classifier layer.

In some embodiments, engineering the language model prompt includes including 814 the potential context in the prompt as an included context 210, deriving 818 a priority 526 of the included context from the prompt inclusion score of the potential context, and indicating 820 the priority of the included context in the prompt.

In an example, some embodiments tell the language model how important the context is, based on the prompt inclusion score. For instance, if the prompt inclusion score for a target platform is high, the prompt includes a statement along the lines of "It is very important to consider that the user source code below targets a multiple instruction multiple data computing system platform."

In some embodiments, the computing 704 of the prompt inclusion score of the potential context and the determining 706 based on at least the prompt inclusion score are performed while the source code is open for editing in an editor 122. Thus, the embodiments provide source code editing suggestions, based on output from the language model elicited by the engineered prompt, while the source code is undergoing edits.

Configured Storage Media

Some embodiments include a configured computer-readable storage medium 112. Some examples of storage medium 112 include disks (magnetic, optical, or otherwise), RAM, EEPROMS or other ROMs, and other configurable memory, including in particular computer-readable storage media (which are not mere propagated signals). In some embodiments, the storage medium which is configured is in particular a removable storage medium 114 such as a CD, DVD, or flash memory. A general-purpose memory, which is be removable or not, and is volatile or not, depending on the embodiment, can be configured in the embodiment using items such as code development information 218, context 212, inclusion scores 304, embedding similarity scores 320, relationship data structures 220, and scoring models 224, in the form of data 118 and instructions 116, read from a removable storage medium 114 and/or another source such as a network connection, to form a configured storage medium. The configured storage medium 112 is capable of causing a computer system 202 to perform technical process steps for providing or utilizing prompt engineering functionality 204 as disclosed herein. The Figures thus help illustrate configured storage media embodiments and process (a.k.a. method) embodiments, as well as system and process embodiments. In particular, any of the method steps illustrated in FIG. 7 or 8, or otherwise taught herein, may be used to help configure a storage medium to form a configured storage medium embodiment.

Some embodiments use or provide a computer-readable storage device 112, 114 configured with data 118 and instructions 116 which upon execution by a processor 110 cause a computing system 202 to perform a method 800 of engineering a language model prompt for submission to a language model. This method 800 includes: obtaining 802 code development information which is associated with a source code; ascertaining 702 a relationship between the code development information and a potential context, at least a portion of the potential context or the prompt having a precomputed embedding 134 in an embedding space of the language model; computing 704 a prompt inclusion score of the potential context, based on at least the relationship;

determining 706 or 830 or both, based on at least the prompt inclusion score, at least one of: whether to include the potential context in the language model prompt, or where to position the potential context in the language model prompt; and producing 708 the language model prompt based on at least a result of the determining.

Some embodiments check for non-default environment variable values, because they are more likely to be relevant than default values. In some embodiments, obtaining 802 code development information includes: getting 804 a value of an environment variable of a computing environment which includes at least part of the source code 124 or a derived code 640 which is derived from at least part of the source code; and establishing 806 that the value of the environment variable is not a default value 808 of the environment variable. For example, in some embodiments a list or database of default values is checked, and any value not on the list is deemed a non-default value.

In some embodiments, computing 704 the prompt inclusion score of the potential context is based on at least a second relationship 220 between the potential context and the code development information.

In one example, a first relationship 220 ascertained after static analysis indicates that a routine in the potential context is in a call chain of a routine in the source code of the user query, and a second relationship 220 ascertained from potential context metadata and from a project setting in the code development information indicates that both routines target the same dialect 430 of the same programming language. In one scenario, both routines target Embedded C++, which is a dialect of C++ focused on embedded systems such as IoT devices. In such circumstances, some embodiments increase the potential context's inclusion score in response to the presence of the second relationship.

In some embodiments, computing 704 the prompt inclusion score of the potential context is based on at least a relationship 220 between a second potential context and the code development information.

In one example, a first relationship 220 between a routine R1 identified in the code development information and a first potential context indicates that the routine R1 calls a routine R2 identified in the first potential context, and a second relationship indicates that R1 has a return value of type T1 which is identified in a second potential context. In such circumstances, some embodiments increase the inclusion score of both potential contexts in response to the presence of the second relationship.

In some embodiments, computing 704 the prompt inclusion score includes at least one of: calculating 810 a linear regression 512 based on at least the potential context and the code development information; or calculating 810 a logistic regression 512 based on at least the potential context and the code development information.

Additional Observations

Additional support for the discussion of prompt engineering functionality 204 herein is provided under various headings. However, it is all intended to be understood as an integrated and integral part of the present disclosure's discussion of the contemplated embodiments.

One of skill will recognize that not every part of this disclosure, or any particular details therein, are necessarily required to satisfy legal criteria such as enablement, written description, best mode, novelty, nonobviousness, inventive step, or industrial applicability. Any apparent conflict with any other patent disclosure, even from the owner of the present subject matter, has no role in interpreting the claims presented in this patent disclosure. With this understanding, which pertains to all parts of the present disclosure, examples and observations are offered herein.

Prompt engineering is an approach in which the prompt to a language model is crafted to produce better results from the language model. But the prompt can only include a limited amount of information, so putting the proper information into the prompt is important. In some embodiments discussed herein, what the user is doing or working on is detected and included in the prompt. Some embodiments use a scoring model to determine what context to place in the prompt. Signals to the scoring model include code development information and potential contexts, as well as indications (implied or stated as signals) of various relationships 220 between code development information and potential contexts. Some scoring models also use an embedding similarity score 320 as an input signal. Some of the scoring model mechanisms discussed herein include formulas, statistical models, machine learning models, and weights or other prioritizations based on recency of change, frequency of change, or similarity of change results. These are also not mutually exclusive, and some embodiments combine two or more of these scoring model mechanisms.

Some embodiments engineer a language model prompt 208 by obtaining some code development info 218, ascertaining a relationship between that info 218 and a potential context 306 that has a precomputed embedding (e.g., by virtue of the language model's training), computing a prompt inclusion score of the potential context based on at least the relationship, and using the prompt inclusion score when determining 706 whether to include the potential context in the prompt, or determining 830 where to position 832 the potential context in the prompt, or both.

In one example, an embodiment obtains 802 some static analysis results 310, ascertains 702 from those results 310 that a type 408 with a precomputed embedding 134 is referenced by a function 402 which is called in code 124 that is part of a user's query, therefore increases 704 a prompt inclusion score 304 of the type, and determines 706 that the type and the static analysis result will be part of the prompt 208 even though the embedding similarity 320 of the type versus the user query is very low.

In another example, an embodiment obtains 802 a compiler search path 316 that overrides a default search path 316, 808, ascertains 702 that due to the search path override a file 436 . . . /special/foo.h will be used by the compiler instead of a file 436 . . . /standard/foo.h that would have been used under the default search path, sets 704 a prompt inclusion score 304 of the file . . . /standard/foo.h to zero and sets 704 a prompt inclusion score 304 of the file . . . /special/foo.h to 40 on a scale of 0 to 100, and determines 706 that part or all of the file . . . /special/foo.h will be part of the prompt 208 and that the file . . . /standard/foo.h will not be part of the prompt 208 even though the embedding similarity 320 of the file . . . /standard/foo.h versus the user query is 20 on a scale of zero to 100. In some embodiments, the user is offered default tool settings to choose from. In some, the user is also offered options specifying whether or when to further filter or enhance tool settings.

Some embodiments improve context relevance for LLM prompts by using code understanding information. The relevance of responses from a large language model often depends heavily on the quality of context provided in the prompt. These models usually have limits on how large the prompts can be, so it is important to select the most relevant context to include in the prompt both for quality and cost reasons. Some approaches for selecting this context involve pre-computing embeddings of all potential contexts (such as files, functions, types, project configuration, environment variables) and then selecting the contexts that are closest in the embedding space 138 to the embedding of the user's query.

Some embodiments replace or augment the context selection process reliance on embedding similarity scores 320 by incorporating additional code understanding information 218. Instead of or in addition to pre-computing LLM embeddings of potential contexts 212, code understanding information is used to add additional dimensions 506 to the context.

For example, when the user is editing a function, additional dimensions include one or more of the following relationships 220:

(For a potential context representing a function) whether the function context calls the function the user is currently editing and whether the function context references the type that the user is currently editing.

(For a potential context representing a type such as a class or struct) whether the type is used in the function the user is currently editing.

(For a potential context representing a file) whether the file is included in the file the user is editing.

(For a potential context representing a project setting such as whether pre-compiled headers are enabled) a flag representing the setting or a flag representing whether this is a project wide setting, or both.

(For a potential context representing environment variables) a flag representing the variable, or the variable value, or whether this a global setting, or a combination of the foregoing.

In some embodiments, any additional dimensions 506 from code understanding information are associated with each potential context in addition to the similarity between the pre-computed LLM embedding and the embedding of the user's query. Then, instead of merely selecting the contexts which have the highest embedding similarity scores, a scoring model 224 is used to combine the embedding similarity 320 with the additional dimensions 506 and produce 704 a final score 304. The potential contexts 306 with the highest final scores 304 are included 814 in the final LLM prompt 208. The characteristics (such as weights) in this scoring model can be tuned 812 to specific use cases.

By including code understanding information in the scoring process, the embodiment makes the final prompt more likely to include relevant context. This benefit is particularly helpful in cases where potential contexts are far apart in LLM embedding space but the code understanding information 218 (such as a call graph or type information) shows that the potential context is relevant.

Unlike some other approaches for extracting relevant context when editing code using LLMs, some embodiments combine LLM embeddings, which have the advantage of being flexible and generic, with code understanding information, which has the advantage of being precise and based on a system understanding well the rules of the underlying programming language. This hybrid approach provides improved relevance of contexts in LLM prompts when compared with either approach alone.

When embodied in software development tools, this hybrid solution helps developers by creating contextually relevant LLM prompts for scenarios involving source code. More relevant contexts in the LLM prompts tend to yield more relevant responses, which leads to a better user experience in development tools 122 that are enhanced with prompt engineering functionality 204.

Some embodiments determine 830 where to place context in a prompt. In many situations, a prompt 208 includes several sections. Different approaches define the sections of a prompt differently, but in some approaches the sections of a prompt include a role, a question or other task, background, and examples. For instance, one prompt reads as follows:

(role) You are a veterinarian.

(background) Tribbles are small furry animals that eat an enormous amount of food when given the chance, and then reproduce very quickly. Tribbles use over half their metabolism for reproduction. They produce cooing and squeaking noises that some people enjoy.

(task) Is a python likely to eat a dozen tribbles? If the python does eat a dozen tribbles, what is likely to happen?

The example above includes the prompt sections in parentheses, but in practice prompt sections are not necessarily labeled in a prompt. Moreover, various prompts include sections in different orders, and in some cases a section is omitted, e.g., the prompt above does not contain examples of what happens when pythons eat something other than tribbles.

Some embodiments use templates, lexical analysis, knowledge of how prompts are generated by a particular program, inference, or other tools and techniques to detect 830 and delimit 830 the sections of a prompt that is being created, and then position 832 the included context 210 in a background section or the like. Indeed, another name for the background section in some scenarios is the context section.

Some embodiments engineer prompts for large language models 130. For present purposes, a language model is "large" if it has at least a billion parameters. For example GPT-2 (OpenAI), MegatronLM (NVIDIA), T5 (Google), Turing-NLG (Microsoft), GPT-3 (OpenAI), GPT-3.5 (OpenAI), and GPT-4 (OpenAI) are each a large language model (LLM) for purposes of the present disclosure, regardless of any definitions to the contrary that may be present in the industry.

In some embodiments, the system 202 is, or includes, an embedded system such as an Internet of Things system. "IoT" or "Internet of Things" means any networked collection of addressable embedded computing or data generation or actuator nodes. An individual node is referred to as an internet of things device 101 or IoT device 101 or internet of things system 102 or IoT system 102. Such nodes are examples of computer systems 102 as defined herein, and may include or be referred to as a "smart" device, "endpoint", "chip", "label", or "tag", for example, and IoT may be referred to as a "cyber-physical system". In the phrase "embedded system" the embedding referred to is the embedding a processor and memory in a device, not the embedding of debug script in source code.

IoT nodes and systems typically have at least two of the following characteristics: (a) no local human-readable display; (b) no local keyboard; (c) a primary source of input is sensors that track sources of non-linguistic data to be uploaded from the IoT device; (d) no local rotational disk storage-RAM chips or ROM chips provide the only local memory; (e) no CD or DVD drive; (f) being embedded in a household appliance or household fixture; (g) being embedded in an implanted or wearable medical device; (h) being embedded in a vehicle; (i) being embedded in a process automation control system; or (j) a design focused on one of the following: environmental monitoring, civic infrastructure monitoring, agriculture, industrial equipment monitoring, energy usage monitoring, human or animal health or fitness monitoring, physical security, physical transportation system monitoring, object tracking, inventory control, supply chain control, fleet management, or manufacturing. IoT communications may use protocols such as TCP/IP, Constrained Application Protocol (CoAP), Message Queuing Telemetry Transport (MQTT), Advanced Message Queuing Protocol (AMQP), HTTP, HTTPS, Transport Layer Security (TLS), UDP, or Simple Object Access Protocol (SOAP), for example, for wired or wireless (cellular or otherwise) communication. IoT storage or actuators or data output or control may be a target of unauthorized access, either via a cloud, via another network, or via direct local access attempts.

Technical Character

The technical character of embodiments described herein will be apparent to one of ordinary skill in the art, and will also be apparent in several ways to a wide range of attentive readers. Some embodiments address technical activities such as static analysis 308, compilation 440, parameter passing, calling 404 routines 402, prompting a language model 130, and executing 824 a machine learning scoring model 224, which are each an activity deeply rooted in computing technology. Some of the technical mechanisms discussed include, e.g., language models 130, prompt content producers 302, relationship ascertainers 222, scoring models 224, and parameter passing mechanisms 432. Some of the technical effects discussed include, e.g., production of a prompt 208 which includes relevant context 210 even when that context has a low embedding similarity score 320, production of a prompt 208 which excludes irrelevant context 212 even when that context has a high embedding similarity score 320, and production of a prompt 208 which identifies a relationship 220 between included context 210 and code development info 218 such as a static analysis result 310. Thus, purely mental processes and activities limited to pen-and-paper are clearly excluded. Other advantages based on the technical characteristics of the teachings will also be apparent to one of skill from the description provided.

One of skill understands that language model prompt engineering generally is a technical activity which is not performed mentally because it involves testing prompts by submitting them to a language model interface 132, receiving language model 130 execution outputs in response to the submitted prompts, and otherwise altering the state of computing system memory 112. Execution of language models 130 cannot be performed mentally or manually. Neither can static analysis 308 be performed mentally or manually at the production or commercial levels presumed herein. Neither can prompt engineering be operationally integrated with integrated development environments, source code editors, build tool chains, and other software development tools 122, except through the execution of software in a computing system 202. One of skill also understands that attempting to perform prompt engineering even in part manually would create unacceptable delays in program execution, pose security risks, create inconsistencies, and introduce a risk of human errors that cause avoidable problems. People manifestly lack the speed, accuracy, memory capacity, and specific processing capabilities required to perform prompt engineering as taught herein.

In particular, prompt engineering based on augmentation of embedding similarity scores 320 with code development information 218 is a part of computing technology. Hence, the prompt engineering improvements such as functionality 204 described herein are improvements to computing technology.

Different embodiments provide different technical benefits or other advantages in different circumstances, but one of skill informed by the teachings herein will acknowledge that particular technical advantages will likely follow from particular embodiment features or feature combinations, as noted at various points herein. Any generic or abstract aspects are integrated into a practical application such as an integrated development environment, version control repository, source code editor, build tool chain, machine-learning-assisted debugger, or other software development tool 122.

Some embodiments described herein may be viewed by some people in a broader context. For instance, concepts such as efficiency, reliability, user satisfaction, or waste may be deemed relevant to a particular embodiment. However, it does not follow from the availability of a broad context that exclusive rights are being sought herein for abstract ideas; they are not.

Rather, the present disclosure is focused on providing appropriately specific embodiments whose technical effects fully or partially solve particular technical problems, such as how to objectively measure the relevance of potential content of a language model prompt, how to identify and include more-likely-to-be-relevant context in a language model prompt, and how to identify and exclude less-likely-to-be-relevant context from a language model prompt. Other configured storage media, systems, and processes involving efficiency, reliability, user satisfaction, or waste are outside the present scope. Accordingly, vagueness, mere abstractness, lack of technical character, and accompanying proof problems are also avoided under a proper understanding of the present disclosure.

Additional Combinations and Variations

Any of these combinations of software code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

More generally, one of skill will recognize that not every part of this disclosure, or any particular details therein, are necessarily required to satisfy legal criteria such as enablement, written description, or best mode. Also, embodiments are not limited to the particular scenarios, motivating examples, operating environments, tools, peripherals, software process flows, identifiers, repositories, data structures, data selections, naming conventions, notations, control flows, or other implementation choices described herein. Any apparent conflict with any other patent disclosure, even from the owner of the present subject matter, has no role in interpreting the claims presented in this patent disclosure.

Acronyms, Abbreviations, Names, and Symbols

Some acronyms, abbreviations, names, and symbols are defined below. Others are defined elsewhere herein, or do not require definition here in order to be understood by one of skill.

ALU: arithmetic and logic unit

API: application program interface
BIOS: basic input/output system
CD: compact disc
CPU: central processing unit
DVD: digital versatile disk or digital video disc
FPGA: field-programmable gate array
FPU: floating point processing unit
GDPR: General Data Protection Regulation
GPU: graphical processing unit
GUI: graphical user interface
HTTPS: hypertext transfer protocol, secure
IaaS or IAAS: infrastructure-as-a-service
LAN: local area network
OS: operating system
PaaS or PAAS: platform-as-a-service
RAM: random access memory
ROM: read only memory
TPU: tensor processing unit
UEFI: Unified Extensible Firmware Interface
UI: user interface
WAN: wide area network Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Sharing a reference numeral does not mean necessarily sharing every aspect, feature, or limitation of every item referred to using the reference numeral. Omission of a reference numeral from a given piece of text does not necessarily mean that the content of a Figure is not being discussed by the text. The present disclosure asserts and exercises the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

A "computer system" (a.k.a. "computing system") may include, for example, one or more servers, motherboards, processing nodes, laptops, tablets, personal computers (portable or not), personal digital assistants, smartphones, smartwatches, smart bands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

A "routine" is a callable piece of code which normally returns control to an instruction just after the point in a program execution at which the routine was called. Depending on the terminology used, a distinction is sometimes made elsewhere between a "function" and a "procedure": a function normally returns a value, while a procedure does not. As used herein, "routine" includes both functions and procedures. A routine may have code that returns a value (e.g., sin(x)) or it may simply return without also providing a value (e.g., void functions).

"Service" means a consumable program offering, in a cloud computing environment or other network or computing system environment, which provides resources to multiple programs or provides resource access to multiple programs, or does both. A service implementation may itself include multiple applications or other programs.

"Cloud" means pooled resources for computing, storage, and networking which are elastically available for measured on-demand service. A cloud 136 may be private, public, community, or a hybrid, and cloud services may be offered in the form of infrastructure as a service (laaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write). A cloud may also be referred to as a "cloud environment" or a "cloud computing environment".

"Access" to a computational resource includes use of a permission or other capability to read, modify, write, execute, move, delete, create, or otherwise utilize the resource. Attempted access may be explicitly distinguished from actual access, but "access" without the "attempted" qualifier includes both attempted access and access actually performed or provided.

Herein, activity by a user refers to activity by a user device or activity by a user account, or by software on behalf of a user, or by hardware on behalf of a user. Activity is represented by digital data or machine operations or both in a computing system. Activity within the scope of any claim based on the present disclosure excludes human actions per se. Software or hardware activity "on behalf of a user" accordingly refers to software or hardware activity on behalf of a user device or on behalf of a user account or on behalf of another computational mechanism or computational artifact, and thus does not bring human behavior per se within the scope of any embodiment or any claim.

"Digital data" means data in a computing system, as opposed to data written on paper or thoughts in a person's mind, for example. Similarly, "digital memory" refers to a non-living device, e.g., computing storage hardware, not to human or other biological memory.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" may also be used as a patent law term of art, e.g., in describing a process claim as opposed to a system claim or an article of manufacture (configured storage medium) claim. Similarly, "method" is used herein primarily as a technical term in the computing science arts (a kind of "routine") but it is also a patent law term of art (akin to a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided. Steps performed automatically are presumed to include at least one operation performed proactively.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment, particularly in real-world embodiment implementations. Prompt engineering operations such as static analysis 308, scoring model execution 824, ascertaining 702 relationships 220, obtaining 802 project settings 314 and other tool status 604 data 218, and many other operations discussed herein (whether recited in the Figures or not), are understood to be inherently digital. A human mind cannot interface directly with a CPU or other processor, or with RAM or other digital storage, to read and write the necessary data to perform the prompt engineering steps 800 taught herein even in a hypothetical or actual prototype situation, much less in an embodiment's real world large computing environment. This would all be well understood by persons of skill in the art in view of the present disclosure.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user, and indicates machine activity rather than human activity. Indeed, a user may not even realize that a proactive step by an embodiment was possible until a result of the step has been presented to the user. Except as otherwise stated, any computational and/or automatic step described herein may also be done proactively.

"Based on" means based on at least, not based exclusively on. Thus, a calculation based on X depends on at least X, and may also depend on Y.

Throughout this document, use of the optional plural "(s)", "(es)", or "(ies)" means that one or more of the indicated features is present. For example, "processor(s)" means "one or more processors" or equivalently "at least one processor".

"At least one" of a list of items means one of the items, or two of the items, or three of the items, and so on up to and including all N of the items, where the list is a list of N items. The presence of an item in the list does not require the presence of the item (or a check for the item) in an embodiment. For instance, if an embodiment of a system is described herein as including at least one of A, B, C, or D, then a system that includes A but does not check for B or C or D is an embodiment, and so is a system that includes A and also includes B but does not include or check for C or D. Similar understandings pertain to items which are steps or step portions or options in a method embodiment. This is not a complete list of all possibilities; it is provided merely to aid understanding of the scope of "at least one" that is intended herein.

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this disclosure discusses various data values and data structures, and recognize that such items reside in a memory (RAM, disk, etc.), thereby configuring the memory. One of skill will also recognize that this disclosure discusses various algorithmic steps which are to be embodied in executable code in a given implementation, and that such code also resides in memory, and that it effectively configures any general-purpose processor which executes it, thereby transforming it from a general-purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a computational step on behalf of a party of interest, such as analyzing, ascertaining, associating, calculating, computing, deriving, determining, editing, embedding, engineering, establishing, evaluating, excluding (a.k.a. not including), executing, getting, giving weight, including, obtaining, positioning, prioritizing, producing, scoring, training, tuning (and analyzes, analyzed, ascertains, ascertained, etc.) with regard to a destination or other subject may involve intervening action, such as the foregoing or such as forwarding, copying, uploading, downloading, encoding, decoding, compressing, decompressing, encrypting, decrypting, authenticating, invoking, and so on by some other party or mechanism, including any action recited in this document, yet still be understood as being performed directly by or on behalf of the party of interest. Example verbs listed here may overlap in meaning or even be synonyms; separate verb names do not dictate separate functionality in every case.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other storage device or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory and computer readable storage devices are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe aspects of embodiments by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment; includes one or more systems 102

101 machine in a system 102, e.g., any device having at least a processor 110 and a memory 112 and also having a distinct identifier such as an IP address or a MAC (media access control) address; may be a physical machine or be a virtual machine implemented on physical hardware

102 computer system, also referred to as a "computational system" or "computing system", and when in a network may be referred to as a "node"

104 users, e.g., user of an enhanced system 202

106 peripheral device

108 network generally, including, e.g., LANs, WANs, software-defined networks, clouds, and other wired or wireless networks

110 processor or set of processors; includes hardware

112 computer-readable storage medium, e.g., RAM, hard disks

114 removable configured computer-readable storage medium

116 instructions executable with processor; may be on removable storage media or in other memory (volatile or nonvolatile or both)

118 digital data in a system 102; data structures, values, source code, and other examples are discussed herein

120 kernel(s), e.g., operating system(s), BIOS, UEFI, device drivers; also refers to an execution engine such as a language runtime

122 software tools, software applications, security controls; computational

124 source code, as represented in a computing system

126 display screens, also referred to as "displays"

128 computing hardware not otherwise associated with a reference number 106, 108, 110, 112, 114

130 language model, e.g., large language model (LLM), multimodal language model, foundation model, artificial intelligence model; computational

132 interface in a computing system to a language model, e.g., an API

134 embedding in a language model, e.g., training data embedded in a model via training

136 cloud, also referred to as cloud environment or cloud computing environment

138 embedding space in a language model, e.g., a set of actual or permitted embeddings, as represented in a computing system

202 enhanced computing system, i.e., system 102 enhanced with functionality 204 as taught herein

204 prompt engineering functionality (also referred to as "development info-augmented prompt engineering functionality", "functionality 204"), e.g., software or specialized hardware which performs or is configured to perform steps 704, 706, and 708, or steps 702, 706, and 708, or steps 704, 814, and 708, or steps 704, 816, and 708, or steps 822, 706, and 708, or steps 824, 706, and 708, or any software or hardware which performs or is configured to perform a novel method 800 or a computational prompt engineering functionality activity first disclosed herein

208 language model prompt, as represented in a computing system

210 context (a.k.a. content) 212 which is included in a prompt that is being, or has been, produced 708; an example of digital data 118

212 context (a.k.a. content) which is not necessarily included in a prompt; an example of digital data 118

214 code, as represented in a computing system; includes source code 124 or derived code 640 or both

216 code development, e.g., software editing, compiling, committing to a repository, building, debugging, profiling, or deploying

218 code development information, e.g., code understanding information (e.g., static analysis results) or code environment information (e.g., environment variable values, project settings; also referred to as development info; an example of digital data 118

220 relationship between data in code development information 218 and data in a context 212 or in context metadata, as represented in a computing system; also described as a particular circumstance, e.g., a "routine references type" circumstance or a "files are from the same codebase" circumstance

222 relationship ascertainer, e.g., software configured to upon execution ascertain one or more relationships, e.g., by parsing static analysis results and other information 218 and searching for strings that are associated with potential contexts or with embeddings 134 training data; some embodiments precompute relationships in a background process

224 scoring model; computational; note that although in some embodiments a scoring model and the language model for which a prompt is engineered are each a machine learning model, in general the scoring model is smaller, and it is also trained on different data as discussed herein

302 prompt content producer, e.g., software which upon execution performs at least some computation 704 of an inclusion score 304 of potential context (e.g., by retrieving a previously assigned score 304, evaluating 822 a scoring formula, or executing 824 a scoring model 224) and determining 706 based on at least the score 304 whether to include 814 that scored context in a prompt 208, and including/excluding the scored content per the determination

304 inclusion score; digital

306 potential context 212, that is, context 212 for which a determination 706 is not yet completed; digital

308 static analysis computational process or software which performs a static analysis computational process, e.g., to find all references to a symbol X or find where a symbol X is defined in code; some embodiments leverage a static analysis capability of a source code editor or an integrated development environment (IDE) 122 language service, which is already designed to deal with incomplete or erroneous source code, e.g., in code completion functionality or hovertext functionality

310 result of static analysis, as represented in a computing system

312 software development project, as represented in a computing system

314 project 312 setting, as represented in a computing system, e.g., environment settings such as programming language or target architecture, search paths, user settings such as editor preferences, tool extensions, security configuration, workspace settings

316 environment variable or its value, as represented in a computing system, e.g., search paths; an example of a variable 406

318 development tool data 318, e.g., any data exportable from a tool 122 or any data indicating whether a tool is installed or is in use, or data 118 identifying a tool version or a tool configuration

320 embedding similarity score that represents similarity in a language model embedding space; also refers to the similarity indicated by the score; digital; measured, e.g., as Euclidean distance, cosine distance, dot product, Pearson correlation, Hamming distance, Jaccard similarity, editing distance, longest common substring, etc.

322 interface generally in a computing system; computational, digital

402 software routine, as represented in a computing system

404 call (a.k.a. invocation) to or by a routine 402, as represented in a computing system

406 variable, as represented in a computing system

408 data type, e.g., class or primitive (built-in) data type, as represented in a computing system

410 compilation dependency, as represented in a computing system

412 codebase, as represented in a computing system

414 software program, e.g., application, kernel, tool, as represented in a computing system

416 software component, e.g., library, data file, image file, source code file, derived code file, as represented in a computing system

418 parameter of a routine 402, as represented in a computing system

420 software library, as represented in a computing system

422 kernel family, e.g., multi-tasking operating systems, embedded operating systems, real-time operating systems, Linux® kernels or operating systems (mark of Linus Torvalds), Windows® operating systems (mark of Microsoft Corporation), etc., as represented in a computing system

424 hardware architecture, e.g., processor instruction set architecture, processor microarchitecture

426 hardware architecture family, e.g., processor instruction set architecture, processor microarchitecture, GPU, x86, ARM, etc.

428 programming language, as represented in a computing system

430 programming language dialect, e.g., version of a programming language dialect, as represented in a computing system, e.g., e.g. C++ 11, C++20; a style of programming in a programming language is treated as a dialect in some embodiments, e.g., in some scenarios Embedded C++ is not formally a different language than C++ but is a style of programming in C++ which is used by developers targeting embedded systems, and which is characterized by one or more of: avoiding exceptions, using memory mapped registers, favoring smaller program sizes, and minimizing stack size

432 parameter passing mechanism, e.g., by reference or by value, for passing a parameter to a routine, as represented in a computing system

434 likelihood of inclusion of a potential context in a prompt, as based on A/B testing, statistics, or other approaches that are not fully subjective but not necessarily comprehensive or fully consistent

436 file, as represented in a computing system

438 codebase style, also referred to as codebase architecture, as represented in a computing system, e.g., Microsoft Foundation Class, Active Template Library, Universal Windows Platform, Component Object Model, Linux®, Embedded, Mobile Development, or software framework

440 computational activity of software compilation or result thereof, in a computing system

442 platform, as represented in a computing system

502 context inclusion scoring formula, as represented in a computing system; in some embodiments a formula includes a condition, e.g., the score is decreased when no static analysis result was found corresponding to the context that is being scored

504 weight in a formula 502 or other scoring calculation, as represented in a computing system; in some embodiments a weight can be zero

506 dimension in a formula 502 or other scoring calculation, as represented in a computing system, e.g., embedding similarity score 320, presence/absence of a relationship 220, piece of code development information 218, or potential context

508 scoring value assigned to a dimension 506, as represented in a computing system

510 statistical scoring model, e.g., one based on a regression 512 calculation; computational

512 computational activity of calculating a statistical regression, or a result thereof, as represented in a computing system; e.g., linear regression or logistic regression

514 machine learning computational activity, as represented in a computing system

516 machine learning scoring model, e.g., one that takes as inputs an embedding vector and dimensions and produces as output an indication whether to include context corresponding to the embedding vector in a prompt, e.g., a relevance ranking

518 input to a scoring model 224; digital

520 characteristic of being recently changed per a defined threshold, or data having that characteristic, as represented in a computing system

522 characteristic of being frequently changed per a defined threshold, or data having that characteristic, as represented in a computing system

524 similarity or characteristic of being similar or measure thereof per a defined metric, as represented in a computing system

526 priority, as represented in a computing system

602 tool history, e.g., sequence of data received in the tool, computations performed in the tool, computation results, and data sent out of the tool, as represented in a computing system

604 tool status, e.g., tool settings, error conditions raised by the tool or encountered by the tool, tool version, whether tool is installed, tool configuration, whether tool is executing, as represented in a computing system

606 tool data, e.g., data 118 representing tool history or tool status or both; e.g., which programming language is in use, name of file currently being edited, which other files are open

608 source code completion computational activity or result thereof, as represented in a computing system

610 data 118 representing code completion in a computing system, e.g., IntelliSense® or IntelliCode™ autocompletion data (marks of Microsoft Corporation) or live editing compiler information

612 browsing computational activity or result thereof, as represented in a computing system

614 data 118 representing browsing in a computing system

616 program building or component building computational activity or result thereof, as represented in a computing system

618 data 118 representing program building or component building in a computing system

620 debugging computational activity or result thereof, as represented in a computing system

622 data 118 representing debugging in a computing system

624 version controlling computational activity or result thereof, as represented in a computing system, e.g., repository activity

626 data 118 representing version controlling in a computing system

628 software testing computational activity or result thereof, as represented in a computing system

630 data 118 representing software testing in a computing system

632 performance profiler or performance profiling computational activity or result thereof, as represented in a computing system

634 data 118 representing performance profiler or performance profiling in a computing system

636 user query as represented in a computing system, e.g., query formulated by a computational process or received by a computational process

638 change in data 118

640 derived code, e.g., code generated from source code by compilation, preprocessor action, or other computational activity, e.g., intermediate code, executable code

700 flowchart; 700 also refers to prompt engineering methods that are illustrated by or consistent with the FIG. 7 flowchart or any variation of the FIG. 7 flowchart described herein

702 computationally ascertain a relationship 220, e.g., by comparing development info 218 to potential contexts 306

704 computationally compute an inclusion score

706 computationally determine whether to include context in a prompt, e.g., by comparing the context's inclusion score to a threshold; in some embodiments the threshold changes as available space in the prompt changes, e.g., less available space means the inclusion score must be higher to get the context included

708 computationally produce a prompt, e.g., by assembling or creating prompt content in memory 112 sufficiently to submit the prompt to a language model via an interface 132; production does not necessarily include submission of the prompt to the language model

800 flowchart; 800 also refers to prompt engineering methods that are illustrated by or consistent with the FIG. 8 flowchart, which incorporates the FIG. 7 flowchart and other steps taught herein, or methods that are illustrated by or consistent with any variation of the FIG. 8 flowchart described herein

802 computationally obtain code development info, e.g., via tool APIs

804 computationally get an environment variable value, e.g., via a tool API or a system call

806 computationally establish that a value is not a default value, e.g., by comparison to a list of default values

808 default value of a variable in a computing system

810 computationally calculate a regression, e.g., using a statistics library

812 computationally tune a scoring model

814 computationally include context in a prompt

816 computationally select between inclusion and non-inclusion, by selecting non-inclusion of content

818 computationally derive a context weight or priority for indication in a prompt, e.g., from the context's inclusion score

820 computationally indicate a context weight or priority in a prompt, e.g., by including a text statement of the weight or priority

822 computationally evaluate a scoring formula, e.g., by executing conditional and arithmetic operations in a computing system

824 computationally execute a scoring model

826 computationally assign a weight or a priority to an item

828 computationally determine that a context is similar to a changed value in a user query or in tool data

830 computationally determine a position 832 for a context

832 position for a context in a prompt, e.g., relative to other context or in a particular section of the prompt

834 any step or item discussed in the present disclosure that has not been assigned some other reference numeral; 834 may thus be shown expressly as a reference numeral for various steps or items or both, and may be added as a reference numeral (in the current disclosure or any subsequent patent application which claims priority to the current disclosure) for various steps or items or both without thereby adding new matter

CONCLUSION

Some embodiments engineer a prompt 208 for submission to a language model 130, such as a software development large language model. Some embodiments ascertain a relationship 220 between code development information 218 and potential context 306. Code development information includes static analysis results 310, project settings 314, development tool history or status data 606, and other software development data which augments the training data previously embedded 134 in the language model 130 by training. Some embodiments compute 704 a prompt inclusion score 304 of the potential context, based on at least the relationship, and use the inclusion score to determine 706 whether to include 814 the potential context in the language model prompt. In some scenarios, an embodiment determines 830 where to place the context in the prompt. Scoring 704 is performed by a formula 502, a statistical scoring model 510, or a machine learning scoring model 516. Some embodiments reduce context inclusion 814 false positives and false negatives that were based on the use of embedding similarity scores 320 alone, by not including context that would have been included (false positive) on the basis of only the embedding similarity score 320, and by including context that would not have been included (false negative) on the basis of only the embedding similarity score 320.

Embodiments are understood to also themselves include or benefit from tested and appropriate security controls and privacy controls such as the General Data Protection Regulation (GDPR). Use of the tools and techniques taught herein is compatible with use of such controls.

Although Microsoft technology is used in some motivating examples, the teachings herein are not limited to use in technology supplied or administered by Microsoft. Under a suitable license, for example, the present teachings could be embodied in software or services provided by other cloud service providers.

Although particular embodiments are expressly illustrated and described herein as processes, as configured storage media, or as systems, it will be appreciated that discussion of one type of embodiment also generally extends to other embodiment types. For instance, the descriptions of processes in connection with the Figures also help describe configured storage media, and help describe the technical effects and operation of systems and manufactures like those discussed in connection with other Figures. It does not follow that any limitations from one embodiment are necessarily read into another. In particular, processes are not necessarily limited to the data structures and arrangements presented while discussing systems or manufactures such as configured memories.

Those of skill will understand that implementation details may pertain to specific code, such as specific thresholds, comparisons, specific kinds of platforms or programming languages or architectures, specific scripts or other tasks, and specific computing environments, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification. The abstract is provided for convenience and for compliance with patent office requirements; it is not a substitute for the claims and does not govern claim interpretation in the event of any apparent conflict with other parts of the specification. Similarly, the summary is provided for convenience and does not govern in the event of any conflict with the claims or with other parts of the specification. Claim interpretation shall be made in view of the specification as understood by one of skill in the art; it is not required to recite every nuance within the claims themselves as though no other disclosure was provided herein.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A method performed by a computing system, the method comprising:

receiving a first language model prompt that requests performance of a task regarding development of source code;

ascertaining a relationship between code development information, which is associated with the development of the source code, and potential prompt content, at least a portion of the potential prompt content or the first language model prompt having a precomputed embedding in an embedding space of a language model;

computing a prompt inclusion score of the potential, prompt content based on at least the relationship between the code development information and the potential prompt content, the prompt inclusion score indicating relevance of the potential prompt content to the code development information;

generating a second language model prompt by including the potential prompt content in the first language model prompt, based on at least the prompt inclusion score being greater than an inclusion score threshold; and causing the language model to perform the task regarding the development of the source code by providing the second language model prompt to the language model.

2. The method of claim 1, wherein the code development information comprises a result of a static analysis of at least part of the source code.

3. The method of claim 1, wherein the relationship indicates at least one of:

a first routine identified in the code development information is configured to upon execution call a second routine identified in the potential prompt content;

a first routine identified in the potential prompt content is configured to upon execution call a second routine identified in the code development information;

a routine identified in the code development information references a type identified in the potential prompt content;

a routine identified in the potential prompt content references a type identified in the code development information;

a source code statement identified in the code development information references a variable identified in the potential prompt content;

a source code statement identified in the potential prompt content references a variable identified in the code development information;

a first file identified in the code development information has a compilation dependency on a second file identified in the potential prompt content;

a second file identified in the potential prompt content has a compilation dependency on a first file identified in the code development information;

a software development project identified in the code development information references a software development project setting identified in the potential prompt content;

a software development project identified in the potential prompt content references a software development project setting identified in the code development information;

a computing environment identified in the code development information references an environment variable identified in the potential prompt content; or a computing environment identified in the potential prompt content references an environment variable identified in the code development information.

4. The method of claim 1, wherein the relationship indicates at least one of:

a file identified in the code development information targets a platform, and a file identified in the potential prompt content also targets the platform, wherein the platform is distinguished from other platforms by at least one of: a kernel family, or a processor hardware architecture family;

a file identified in the code development information belongs to a codebase, and a file identified in the potential prompt content also belongs to the codebase, wherein the codebase includes a collection of source codes identified for use in building a particular software program, a particular computing system component, or a particular computing system;

a file identified in the code development information is part of a software library or depends on the software library, and a file identified in the potential prompt content also is part of the software library or depends on the software library;

a portion of source code or a tool identified in the potential prompt content targets a particular dialect of a programming language, and a portion of source code or a tool identified in the code development information also targets the particular dialect of the programming language;

a portion of source code or a tool or a project identified in the potential prompt content targets a particular codebase architecture, and a portion of source code or a tool or a project identified in the code development information also targets the particular codebase architecture;

a routine parameter identified in the potential prompt content is passed by reference, and a routine parameter identified in the code development information is also passed by reference; or a routine parameter identified in the potential prompt content is passed by value, and a routine parameter identified in the code development information is also passed by value.

5. The method of claim 1, wherein computing the prompt inclusion score comprises at least one of:

evaluating a formula which includes a weighted sum of dimension values, each dimension value corresponding to a respective piece of the code development information or else corresponding to a respective potential prompt content;

executing a statistical scoring model;

executing a machine learning scoring model;

giving a greater weight or a higher priority to a most recently changed potential prompt content;

giving a greater weight or a higher priority to a most frequently changed potential prompt content; or giving a greater weight or a higher priority to a potential prompt content in response to determining that a change involving the potential prompt content is within a predefined threshold of similarity to a change indicated in the code development information.

6. The method of claim 1, wherein computing the prompt inclusion score comprises executing a scoring model, and wherein the method further comprises tuning the scoring model.

7. The method of claim 1, further comprising:

deriving a priority of the potential prompt content from the prompt inclusion score; and indicating the priority of the potential prompt content in the prompt.

8. The method of claim 1, wherein computing of the prompt inclusion score and generating the second language model prompt are performed while the source code is open for editing in an editor.

9. A computing system comprising:

a processor set; and a memory that stores computer-executable instructions that are executable by the processor set to at least:

receive a first language model prompt that requests performance of a task regarding development of source code;

ascertain a relationship between code development information, which is associated with the development of the source code, and potential prompt content, at least a portion of the potential prompt content or the first language model prompt having a precomputed embedding in an embedding space of a language model;

compute a prompt inclusion score of the potential prompt content based on at least the relationship between the code development information and the potential prompt content, the prompt inclusion score indicating relevance of the potential prompt content to the code development information;

based on at least the prompt inclusion score being greater than an inclusion score threshold, generate a second language model prompt by including the potential prompt content in the first language model prompt; and cause the language model to perform the task regarding the development of the source code by providing the second language model prompt to the language model.

10. The computing system of claim 9, wherein the code development information comprises at least one of:

a result of a static analysis of at least part of the source code;

a project setting of a software development project which includes at least part of the source code or includes a derived code which is derived from at least part of the source code; or an environment variable of a computing environment which includes at least part of the source code or includes a derived code which is derived from at least part of the source code.

11. The computing system of claim 9, wherein the code development information comprises at least one of:

a code completion data representing a code completion;

a browsing data representing a browsing history or a browsing status;

a build data representing a software build history or a software build status;

a debug data representing a software debug history or a software debug status;

a test suite data representing a test suite history or a test suite status;

a profiler data representing a profiler history or a profiler status; or a version control data representing a software version control history or a software version control status.

12. The computing system of claim 9, wherein the relevance of the potential prompt content to the code development information, which is indicated by the prompt inclusion score, is greater than a second relevance of the potential prompt content to the code development information that depends only on an embedding similarity score that represents similarity of the potential prompt content to the code development information.

13. The computing system of claim 9, wherein the relevance of the potential prompt content to the code development information, which is indicated by the prompt inclusion score, is less than a second relevance of the potential prompt content to the code development information that depends only on an embedding similarity score that represents similarity of the potential prompt content to the code development information.

14. The computing system of claim 9, wherein the computer-executable instructions are executable by the processor set to compute the prompt inclusion score based on at least;

the precomputed embedding or an embedding similarity value, which depends on at least the precomputed embedding, and at least a portion of the code development information.

15. The computing system of claim 14, wherein the computer-executable instructions are executable by the processor set to compute the prompt inclusion score using a machine learning technique.

16. A computer-readable storage device having instructions recorded thereon for enabling a processor-based system to perform actions, the actions comprising:

receiving a first language model prompt that requests performance of a task regarding development of source code;

ascertaining a relationship between code development information, which is associated with the development of the source code, and potential prompt content, at least a portion of the potential prompt content or the first language model prompt having a precomputed embedding in an embedding space of a language model;

computing a prompt inclusion score of the potential prompt content, based on at least the relationship between the code development information and the potential prompt content, the prompt inclusion score indicating relevance of the potential prompt content to the code development information;

based on at least the prompt inclusion score being greater than an inclusion score threshold, generating a second language model prompt by including the potential prompt content in the first language model prompt; and causing the language model to perform the task regarding the development of the source code by providing the second language model prompt, including the potential prompt content, to the language model.

17. The computer-readable storage device of claim 16, wherein the operations further comprise:

getting a value of an environment variable of a computing environment which includes at least part of the source code or a derived code which is derived from at least part of the source code; and establishing that the value of the environment variable is not a default value of the environment variable.

18. The computer-readable storage device of claim 16, wherein computing the prompt inclusion score comprises:

computing the prompt inclusion score further based on at least a second relationship between second potential prompt content and the code development information.

19. The computer-readable storage device of claim 16, wherein computing the prompt inclusion score comprises:

calculating a linear regression based on at least the potential prompt content and the code development information.

20. The computer-readable storage device of claim 16, wherein computing the prompt inclusion score comprises:

calculating a logistic regression based on at least the potential prompt content and the code development information.

* * * * *